Figure 1:
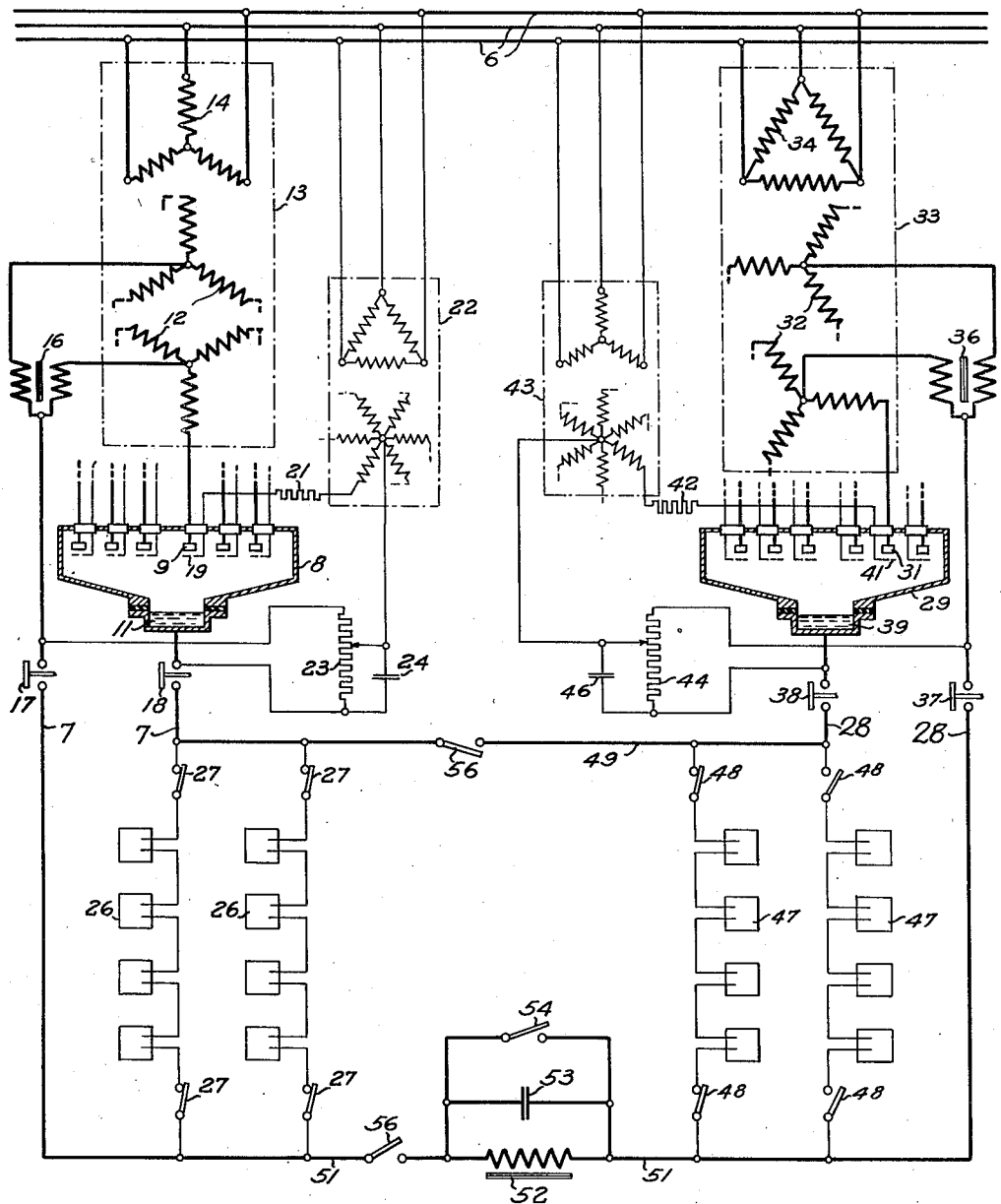

Aug. 16, 1938.　　　W. E. GUTZWILLER　　　2,127,214
ELECTRIC VALVE CONVERTING SYSTEM
Filed June 14, 1937　　　2 Sheets-Sheet 1

Inventor
W. E. Gutzwiller
by
Attorney

Patented Aug. 16, 1938

2,127,214

UNITED STATES PATENT OFFICE 2,127,214

ELECTRIC VALVE CONVERTING SYSTEM

Walter E. Gutzwiller, Wauwatosa, Wis., assignor to Allis-Chalmers Manufacturing Company, Milwaukee, Wis., a corporation of Delaware Application June 14, 1937, Serial No. 147,998

10 Claims. (Cl. 175—363)

This invention relates in general to improvements in electric valve converting systems and more particularly to means for improving the operation of a plurality of current converting elements supplying current to a plurality of output circuits connected in parallel.

Electric valve converting systems are frequently utilized for supplying current to groups of load devices operating in parallel and jointly requiring a larger amount of current than can be transmitted through a single converting element. It is then necessary to utilize a plurality of valve converters which supply current either to separate output circuits or to a common output circuit with which the load devices are connected. In particular, a plurality of converters may be used, for example, for supplying unidirectional current to a plurality of cells serving for the electrolysis of aqueous solutions of electrolytes such as sodium chloride. In the course of such electrolysis it is necessary constantly to supervise and to regulate the supply of electrolyte to the cells and to likewise regulate the removal from the cells of the gases produced therein and the transfer of such gases to suitable storage means.

Such regulation requires the constant attention of a supervisor for each group of cells associated with a common system of electrolyte supply and of gas removal. To reduce the expense inherent in such supervision, it is therefore generally preferred to provide all the cells of a plant with a single electrolyte supply and gas removal system. Such arrangement is possible only if gas is produced at substantially the same rate in all the cells regardless of any changes in the operation of the converters or of the sources of current supply associated therewith. To obtain such result all the cells of the plant are generally supplied from an output circuit common to all the converters. It may, however, be desired to connect the transformers forming part of different converters in different connections for improving the wave form of the current supplied thereto by a common source of alternating current or for other reasons. The converters are then generally connected with a common output circuit through suitable inductive means such as interphase transformers or a plurality of individual reactors to prevent the flow of alternating current between the output terminals of the converters and to cause all converters to simultaneously supply current to the output circuit at every instant. Such inductive means, however, also transmit the load current from the converters to the output circuit and the flow of such current therethrough results in dissipation of energy which materially affects the efficiency of the plant.

It is therefore more advantageous to provide each converter with a separate output circuit directly supplying current to a part of the cells of the plant and to connect the different converter output circuits in parallel through suitable inductive connections. Such connections then control the flow of alternating current between the converters and may be arranged to carry only as much of the load current as is necessary to correct any differences between the values of the output voltages of the different converters.

It is therefore one of the objects of the present invention to provide an electric valve converting system in which a plurality of differently connected converters transmit energy between an alternating current circuit and a plurality of direct current circuits connected in parallel.

It is a further object of the present invention to provide an electric valve converting system in which a plurality of differently connected converters simultaneously supply current at every instant to a plurality of output circuits connected in parallel.

It is a further object of the present invention to provide an electric valve converting system in which a plurality of differently connected converters have their output circuits connected in such manner as to control the flow of alternating current therebetween while maintaining the energy losses in the connection at a minimum value.

Figure 2:
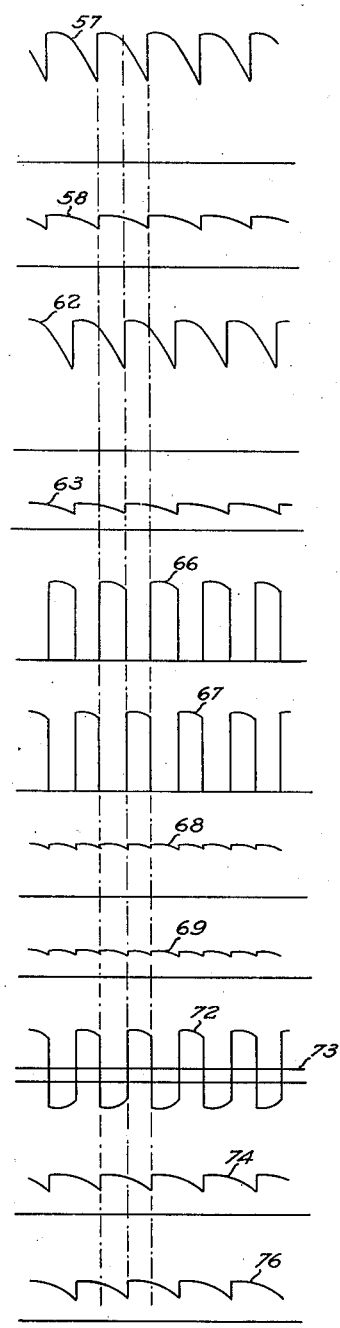
Figure 3:
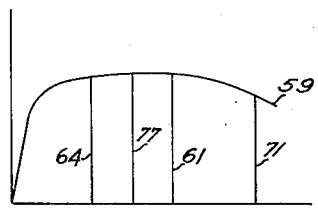

Objects and advantages other than those above set forth will be apparent from the following description when read in connection with the accompanying drawings, in which:

Fig. 1 diagrammatically illustrates one embodiment of the present invention comprising two converters supplied from a common supply circuit and associated with two output circuits connected through an inductive connection;

Fig. 2 is a diagram of some of the voltages and currents of the embodiment illustrated in Fig. 1; and Fig. 3 is a diagram of the variation of the efficiency of the system illustrated in Fig. 1 in function of the value of the current flow therethrough.

Referring more particularly to the drawings by characters of reference, reference numeral 6 designates a source of alternating current such as an alternating current supply line or circuit connected with a suitable generator (not shown). Circuit 6 is to be connected with a direct current output circuit 7 through a converting system comprising one or more electric valves generally designated by 8 for the flow of energy between the circuits. When a plurality of valves are utilized such valves are severally provided with anodes 9 preferably arranged within a common casing, and the cathodes of the valves are then combined into a single cathode structure 11. Suitable means (not shown) are provided for bringing cathode 11 into electron emitting condition and for maintaining the cathode in such condition as is well known.

Anodes 9 are severally connected with the phase portions of the secondary winding 12 of a supply transformer 13 having a primary winding 14 connected with circuit 6. Transformer 13 may be a unitary structure or may consist of an equivalent plurality of single phase transformers having the windings thereof connected in any of the known connections used in converting systems. If circuit 6 is a three phase circuit as illustrated in the drawings, winding 14 may comprise three phase portions connected in star and winding 12 may comprise six phase portions connected in double star to provide two neutral points. Transformer 13 may also be provided with a delta connected tertiary winding for balancing the phase voltages thereof if necessary. The secondary neutral points are connected with one conductor of circuit 7 through the windings of an interphase transformer 16 and through a switch 17. The other conductor of circuit 7 is connected with cathode 11 through a switch 18.

The conductivity of valves 8 may be controlled by means including control electrodes 19 severally associated with anodes 9 and each arranged in or about the path of the discharge occurring between the associated anode and cathode 11. Although valves 8 may be of any suitable known type it will be assumed that the valves are of the discontinuously controllable type. Each control electrode accordingly prevents the flow of current through the associated anode when the control electrode is at a negative potential with respect to the potential of cathode 11 taken as datum for the different control potentials. The control electrode then releases the flow of current through the associated anode when the control electrode is at a positive potential. To obtain such result the different control electrodes are preferably severally connected with cathode 11 through circuits each comprising a current limiting resistor 21 and one of the phase portions of the secondary winding of a control transformer 22 having the primary winding thereof energized from circuit 6. The secondary winding of transformer 22 is connected in star to provide a neutral point which is connected with the tap of a voltage divider 23 connected between cathode 11 and the common terminal of interphase transformer 16. The tap may also be connected with cathode 11 through a capacitor 24 for rendering the potential impressed on the secondary neutral point of transformer 22 from such tap substantially uniform. Circuit 7 supplies current to one or more banks of serially connected electrolytic cells 26 connected therewith through switches 27.

Circuit 6 is also connected with a second direct current output circuit 28 through means connected with such circuit 28 and comprising one or more valves 29 having anodes 31. Anodes 31 are severally connected with the phase portions of the secondary winding 32 of a second supply transformer 33. Such transformer is provided with a primary winding 34 connected with circuit 6 for the flow of energy between circuits 6 and 28. The converting systems comprising valves 8 and 29 are generally similar to one another but the connections of the windings of transformer 33 are different from the connections of the windings of the transformer 13 to cause the moments of initiation of flow of current through valves 8 to alternate with those of valves 29. Such result may be obtained by connecting primary winding 34 in polygon having a number of sides equal to the number of phases of circuit 6. When circuit 6 is a three phase circuit winding 34 is accordingly connected in delta. The connections between circuits 6 and 28 are completed by an interphase transformer 36 connected with one conductor of circuit 28 through a switch 37 and by a switch 38 connecting the second conductor of circuit 28 with cathode 39 of valves 29.

The conductivity of valves 29 may be controlled by means of control electrodes 41 connected through current limiting resistors 42 with the secondary winding phase portions of a second control transformer 43 energized from circuit 6. The connections between control electrodes 41 and cathode 29 are completed by a second voltage divider 44 and a capacitor 46. Circuit 28 supplies current to one or more banks of serially connected electrolytic cells 47 connected therewith through switches 48.

Cells 26 and 47 are assumed to be provided with a common system of electrolyte supply and of gas removal, and hence the currents through the different cells should remain proportional to one another under all operating conditions.

Circuits 7 and 28 are accordingly connected in parallel through a connection comprising suitable inductive means for controlling the flow of alternating current therebetween. In their simplest form such means consist of a conductor 49 forming a common conductor for circuits 7 and 28 and of a second conductor 51 joining the non-common conductors of the circuits. Conductors 49 and 51 are arranged remote from each other to form an inductive connection having a sufficiently high inductance to control the flow of alternating current between circuits 7 and 28. The inductance of the loop thus formed also depends on the physical size of the conductors and may be increased by suitably choosing the constituent elements of such conductors or by arranging suitable members of magnetic material adjacent thereto. If it is not found economical or feasible to obtain such value of inductance by the use of conductors 49 and 51 alone, one of such conductors may comprise an inductive reactor 52. A capacitor 53 may also be connected in parallel with reactor 52 to cooperate therewith to substantially completely prevent the flow of alternating current between circuits 7 and 28. Reactor 52 may be short circuited by a switch 54 and the connections between circuits 7 and 28 may be interrupted by means of switches 56.

It will be understood that further converting systems may be arranged to supply energy obtained from circuit 6 or from other alternating current circuits to further direct current circuits connected in parallel with circuits 7 and 28 through inductive connections. It will also be understood that the system illustrated is also operable for converting direct current supplied to circuits 7 and 28 by suitable direct current generators into alternating current to be supplied to circuit 6.

The operation of the system will be considered assuming conductors 49 and 51 to be substantially without inductance other than the inductance of reactor 52. To render apparent the advantages accruing from the insertion of reactor 52 between circuits 7 and 28, it will at first be assumed that switches 56 are opened so that the two groups of valves 8 and 29 operate independently of each other. When circuit 6 is energized and switches 17 and 18 are closed, anodes 9 are sequentially brought to a positive potential with respect to the potential of cathode 11 and are thus caused to sequentially carry current, the successive current impulses combining at cathode 11 to form a flow of direct current supplied to circuit 7 and to cells 26.

The direct current flows under a unidirectional voltage having a direct component and an alternating component. The magnitudes of such components may be jointly affected by varying the moments of initiation of the flow of current through the several anodes 9. Such result is obtained by so adjusting the direct current potential component impressed on control electrodes 19 from circuit 7 through voltage divider 23 that each control electrode assumes a negative potential when the associated anode reaches a potential higher than the potential of all other anodes 9. The flow of current through such anode is then delayed until the control electrode subsequently assumes a positive potential. As is well known, such action causes the direct voltage component impressed on circuit 7 to be decreased to an extent depending upon the adjustment of voltage divider 23, and the flow of current through cells 26 may be adjusted thereby to any desired value within the capacity of valves 8.

The instantaneous voltage impressed on circuit 7 follows a discontinuous curve such as curve 57 in Fig. 2 and the flow of current from cathode 11 through circuit 7 and cells 26 may be represented by another discontinuous curve 58. Such curves and other curves to be described hereinafter are drawn neglecting the effect of the inductances of circuit 6 and of transformers 13 and 33 on the current so as to simplify the drawings. It will be assumed that each converting system has an efficiency represented by curve 59 in Fig. 3 and that valves 8 deliver the full rated current thereof to cells 26. The efficiency of the converting system 8, 13 is then represented by an ordinate 61 of value equal to substantially the maximum value of efficiency obtainable with the system.

When switches 37 and 38 are closed, valves 29 operate in the manner above described to supply current to cells 47 under a voltage represented by curve 62 in Fig. 2. In order that switches 56 may be closed subsequently the output voltage of valves 29 is adjusted to have substantially the same direct component as the output voltage of valves 8. The alternating components of the two voltages may have substantially the same values but such components are, however, necessarily different in phase by reason of the different connections of windings 14 and 34. It will be assumed, by way of example, that valves 29 are delivering current equal to substantially one-half of the rated output current thereof to one-half of the cells 47 as represented by curve 63 in Fig. 2. The efficiency of such operation is then represented by an ordinate 64 having approximately the value of ordinate 61.

During the operation described above, each of transformers 13 and 33 draws from circuit 6 current which has a fundamental component and two series of components having frequencies which are multiples of the frequency of such fundamental component or so-called harmonic components. The ratios of the frequencies of such components to the frequency of the fundamental component are represented by the formulas $6(2n-1) \pm 1$ and $6(2n) \pm 1$ where $n$ is an integer and the values given by such formulas are called the orders of such harmonic components. The components of orders $6(2n) \pm 1$ of the two transformers are in phase with each other and their presence is not affected by any connection between circuits 7 and 28. The components of order $6(2n-1) \pm 1$, however, are in phase opposition in the two transformers and such components will appear in the current jointly received by the transformers from the source connected with circuit 6, in a lesser proportion than in the currents severally received by the transformers from circuit 6. If valves 8 and 29 were carrying equal currents, the latter components would cancel in the current of circuit 6, but under all other operating conditions such as the condition herein assumed such components are still present in the current of circuit 6 in amounts depending upon the difference between the currents delivered by the two groups of valves.

Under such conditions, if switches 56 and 54 be closed to connect circuits 7 and 28 through a substantially non-conductive connection, such circuits jointly receive the output voltages of the two groups of valves in parallel and only the valve group having the highest output voltage delivers current. If such voltages are represented by curves 57 and 62, each voltage is periodically greater and smaller than the other and hence the load current must be supplied to the cells alternately by the two groups of valves. Valves 8 then supply pulsating current represented by curve 66 and valves 29 supply another pulsating current represented by curve 67. The currents received by cells 26 and 47 are then represented by two curves 68 and 69, respectively, of similar wave forms but of different values. It will be observed that under such conditions valves 8 and 29 carry substantially equal currents so that current components of orders $6(2n-1) \pm 1$ in the current of circuit 6 cancel out. Each group of valves, however, when carrying current at all, supplies current to both the groups of cells 26 and 47 and is then loaded considerably beyond the value obtained during independent operation of the two groups of valves. The efficiency of the system is then represented by an ordinate 71 considerably smaller than ordinates 61 and 64.

During the above operation, switch 54 carries a current represented by curve 72 obtained by subtracting the ordinates of curve 66 from the ordinates of curve 68. Such current has a direct component of value represented by line 73 and an alternating component resulting from the different connections of transformers 13 and 33. The latter component has a peak value equal to one-half of the value of the current jointly consumed by groups of cells 26 and 47 and is of a relatively high frequency compared to the frequency of the voltage of circuit 6. Because conductors utilized in the output circuit of electrolytic plants are generally designed to carry current of the order of several thousand amperes and are of large cross section, the flow of an alternating current of relatively high frequency having a value of several thousand amperes therethrough causes the production therein of eddy current losses which adversely affect the efficiency of the system.

It is for controlling the flow of such alternating current between circuits 7 and 28 that such circuits are connected through reactor 52 or through an equivalent inductive connection. If switch 54 be opened, the alternating component of the circulating current 72 is substantially prevented from flowing between the circuits and substantially only the direct component 73 thereof is permitted to flow. As a result thereof valves 8 and 29 are caused to simultaneously supply current to circuits 7 and 28 at every instant. The valves accordingly carry substantially equal continuous unidirectional currents represented by curves 74 and 76, respectively. Cells 26 and 47 then receive currents represented by curves 58 and 63, respectively, as when these groups of valves operate independently. Each of the two converting systems then supplies current somewhat lower than the rated full load value thereof and the efficiency of the system, represented by an ordinate 77 in Fig. 3, is substantially the highest possible efficiency obtainable with the system. Transformers 13 and 33 then receive equal currents from circuit 6 and the components of order $6(2n-1)\pm1$ of such currents cancel each other in the current supplied to the circuit by the generator. Such result is highly advantageous inasmuch as the flow of such current components through the windings of the generator would increase the losses of the generator to an extent which may cause overheating thereof. The danger of inductive action of such current on any communication circuits adjacent circuit 6 is also thereby reduced to a minimum.

Considering such operation in further detail, the alternating component of current 72 is not entirely suppressed by reactor 52 but is reduced to a value necessary for magnetizing the core of the reactor under an alternating voltage equal to the difference between the output voltages of the two groups of valves represented by curves 57 and 62. Such difference is a complex alternating voltage having a principal component of frequency multiple of the frequency of the voltage of circuit 6. To render the action of reactor 52 more complete, the reactor may be connected in parallel with capacitor 53 tuned therewith to resonance for the frequency of such principal component. The magnetizing current of such principal frequency required by reactor 52 and flowing therethrough between circuits 7 and 28 is then neutralized by an equal and opposite component flowing through capacitor 53, and the flow of alternating current between the circuits is thus reduced to smaller components of higher frequencies which are usually without any material effect on the operation of the system.

During such operation, reactor 52 carries only a substantially uniform current 73 which is considerably less than either one of currents 58 or 63. The losses produced by the flow of such current, which are proportional to the square of the value thereof, are therefore of small value compared to the losses which would be produced by the entire cell current in an interphase transformer joining circuits 7 and 28 or in reactors severally joining such circuits with the associated converters. The use of two separate reactors is specially disadvantageous for the reason that a single reactor 52 may be built with a much lesser number of turns than the aggregate number of turns of two reactors jointly having the same inductance as the single reactor.

The operation above considered is an infrequent condition obtaining only when a bank of cells is disconnected as a result of operating trouble or for reducing the plant production. In general, the entire banks of cells 26 and 47 are connected with circuits 7 and 28. Reactor 52 is then substantially without any current and the losses therein are accordingly substantially zero. On the contrary, the losses in an interphase transformer or in separate reactors would then be a maximum.

The system herein illustrated is adapted to function under all possible operating conditions without interruption of the operation of the plant. For example, banks of cells may be individually connected and disconnected by means of switches 27 and 48 without affecting the operation of the remaining cells. If one of the converters is disconnected from the associated output circuit as a result of the occurrence of an abnormal condition therein or for any other reason, the associated cells are automatically supplied with current from the remaining converter without interruption of the operation thereof. Reactor 52 then carries such current but inasmuch as such reactor then has no useful function, it is preferable to short circuit the reactor by means of switch 54. If the supply of such current causes the remaining converter to be overloaded, the output voltage thereof may be reduced by the action of the control electrodes thereof to reduce the current supplied to the cells to a value not greater than the rated output of the converter.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric valve converting system, the combination with a direct current circuit, means comprising an electric valve for impressing on said circuit a unidirectional voltage having a direct component and an alternating component, a second direct current circuit connected with the first said circuit, means comprising a second electric valve for impressing on said second circuit substantially the said direct voltage component and another alternating voltage component, of inductive means in a connection between said circuits for controlling the flow of alternating current therebetween.

2. In an electric valve converting system, the combination with a direct current circuit, means comprising an electric valve for impressing on said circuit a unidirectional voltage having a direct component and an alternating component, a second direct current circuit connected with the first said circuit, means comprising a second electric valve for impressing on said second circuit substantially the said direct voltage component and another alternating voltage component, of inductive means for connecting said circuits in parallel and for causing the first and second said means to simultaneously supply current to said circuits at every instant.

3. In an electric valve converting system, the combination with a direct current circuit, means comprising an electric valve for impressing on said circuit a unidirectional voltage having a direct component and an alternating component, a second direct current circuit connected with the first said circuit, means comprising a second electric valve for impressing on said second circuit substantially the said direct voltage component and another alternating voltage component, of a reactor having connections with said circuits for controlling the flow of alternating current therebetween.

4. In an electric valve converting system, the combination with a direct current circuit, means comprising an electric valve for impressing on said circuit a unidirectional voltage having a direct component and an alternating component, a second direct current circuit connected with the first said circuit, means comprising a second electric valve for impressing on said second circuit substantially the said direct voltage component and another alternating voltage component, of conductors connecting said circuits in parallel, said conductors being arranged remote from each other to form an inductive connection between said circuits for controlling the flow of alternating current therebetween.

5. In an electric valve converting system, the combination with a direct current circuit, means comprising an electric valve for impressing on said circuit a unidirectional voltage having a direct component and an alternating component, a second direct current circuit, said circuits having a common conductor and non-common conductors, means comprising a second electric valve for impressing on said second circuit substantially the said direct voltage component and another alternating voltage component, of a conductor connecting said non-common conductors and arranged remote from said common conductor to form an inductive connection between said circuits for controlling the flow of alternating current therebetween.

6. In an electric valve converting system, the combination with a direct current circuit, means comprising an electric valve for impressing on said circuit a unidirectional voltage having a direct component and an alternating component, a second direct current circuit connected with the first said circuit, means comprising a second electric valve for impressing on said second circuit substantially the said direct voltage component and another alternating voltage component, of a reactor having connections with said circuits for controlling the flow of alternating current therebetween, and a capacitor connected in parallel with said reactor and cooperating therewith in controlling the flow of alternating current between said circuits.

7. In an electric valve converting system, the combination with an alternating current supply circuit, a direct current output circuit, means comprising an electric valve connecting said supply circuit with said output circuit for impressing on the latter a unidirectional voltage having a direct component and an alternating component, a second direct current output circuit, means comprising a second electric valve connecting said supply circuit with said second output circuit for impressing on the latter substantially the said direct voltage component and another alternating voltage component, of inductive means for connecting said output circuits in parallel and for controlling the flow of alternating current therebetween.

8. In an electric valve converting system, the combination with an alternating current supply circuit, a direct current output circuit, means connecting said supply circuit with said output circuit comprising a transformer and an electric valve, a second direct current output circuit, means connecting said supply circuit with said second output circuit comprising a second transformer and a second electric valve, the connections of the first and second said transformers being different from one another, of inductive means for connecting said output circuits in parallel and for controlling the flow of alternating current between said output circuits caused by the said different transformer connections.

9. In an electric valve converting system, the combination with an alternating current supply circuit, a direct current output circuit, means connecting said supply circuit with said output circuit comprising a transformer and an electric valve, a second direct current output circuit, means connecting said supply circuit with said second output circuit comprising a second transformer and a second electric valve, the connections of the first and second said transformers being different from one another and arranged to cause said transformers to jointly receive from said supply circuit current having a lesser proportion of harmonic components than the currents severally received by said transformers from said supply circuit, of inductive means for connecting said output circuits in parallel and for controlling the flow of alternating current between said output circuits caused by the said different transformer connections.

10. In an electric valve converting system, the combination with a polyphase alternating current supply circuit, a direct current output circuit, means connected with said output circuit comprising a plurality of electric valves and a transformer having a winding arranged in star connected with said supply circuit for the flow of energy between said circuits, a second direct current output circuit, means connected with said second output circuit comprising a second plurality of electric valves and a transformer having a winding arranged in polygon connected with said supply circuit for the flow of energy between said supply circuit and said second output circuit, of inductive means for connecting said output circuits in parallel and for controlling the flow of alternating current between said output circuits caused by said transformer connections.

WALTER E. GUTZWILLER.